(12) United States Patent
Koto et al.

(10) Patent No.: US 8,831,095 B2
(45) Date of Patent: Sep. 9, 2014

(54) IMAGE ENCODING METHOD AND IMAGE DECODING METHOD

(75) Inventors: Shinichiro Koto, Tokyo (JP); Tomoo Yamakage, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 12/585,667

(22) Filed: Sep. 21, 2009

(65) Prior Publication Data

US 2010/0246662 A1  Sep. 30, 2010

(30) Foreign Application Priority Data

Mar. 25, 2009 (JP) ................. 2009-074983

(51) Int. Cl.
*H04N 7/12* (2006.01)
*H04N 11/02* (2006.01)
*H04J 3/04* (2006.01)
*H04N 7/26* (2006.01)
*H04N 7/50* (2006.01)

(52) U.S. Cl.
CPC ..... *H04N 19/0533* (2013.01); *H04N 19/00545* (2013.01); *H04N 19/00278* (2013.01); *H04N 19/0266* (2013.01); *H04N 19/00169* (2013.01); *H04N 19/00781* (2013.01); *H04N 19/0009* (2013.01); *H04N 19/00012* (2013.01); *H04N 19/00272* (2013.01); *H04N 19/00884* (2013.01); *H04N 19/00127* (2013.01)
USPC .............. 375/240.1; 375/240.26; 375/240.03; 370/535

(58) Field of Classification Search
CPC .......... H04N 19/00012; H04N 19/00127; H04N 19/00278; H04N 19/00266; H04N 19/0009; H04N 19/00272; H04N 19/00169; H04N 19/00884; H04N 19/00533; H04N 19/00781; H04N 19/00545; H04N 21/8547; H04N 7/322; H04N 7/3038; H04N 5/0736; H04N 21/44004; H04N 19/00193; H04N 7/26186
USPC ................... 375/240, 240.1, 240.26, 240.03; 370/535

See application file for complete search history.

(56) References Cited

U.S. PATENT DOCUMENTS

| 8,107,744 B2 | 1/2012 | Tian et al. |
| 2001/0031002 A1 | 10/2001 | Hashimoto et al. |
| 2003/0053416 A1 | 3/2003 | Ribas-Corbera et al. |
| 2004/0179619 A1 * | 9/2004 | Tian et al. ............... 375/240.26 |

(Continued)

FOREIGN PATENT DOCUMENTS

| JP | 8-163559 | 6/1996 |
| JP | 2001-346201 | 12/2001 |

(Continued)

OTHER PUBLICATIONS

Jennifer L. H. "Webb, HRD Conformance for Real-time H.264 Video Encoding", Image Processing, 2007. ICIP 2007. IEEE International Conference on, vol. 5.*

(Continued)

*Primary Examiner* — Sath V Perungavoor
*Assistant Examiner* — Xiaolan Xu
(74) *Attorney, Agent, or Firm* — Nixon & Vanderhye, P.C.

(57) ABSTRACT

A moving image encoding method includes outputting encoded data that comprises an image code sequence corresponding to slices of a moving image and first timing information indicating times at which the slices are to be decoded.

9 Claims, 13 Drawing Sheets

(56) References Cited

U.S. PATENT DOCUMENTS

| | | | | |
|---|---|---|---|---|
| 2006/0171423 | A1* | 8/2006 | Helms et al. | 370/535 |
| 2006/0256851 | A1* | 11/2006 | Wang et al. | 375/240.01 |
| 2007/0189380 | A1* | 8/2007 | Goh et al. | 375/240.03 |
| 2007/0253491 | A1* | 11/2007 | Ito et al. | 375/240.24 |

FOREIGN PATENT DOCUMENTS

| | | |
|---|---|---|
| JP | 2003-179665 | 6/2003 |
| JP | 2006-506027 | 2/2006 |
| JP | 2006-518127 | 8/2006 |
| JP | 2007-329953 | 12/2007 |
| WO | 2004/075554 | 9/1994 |

OTHER PUBLICATIONS

ITU-T Recommendation H.262, ISO/IEC 13818-2, Series H: Audio-visual and Multimedia Systems (Infrastructure of audiovisual services—Coding of moving video), Information technology—Generic coding of moving pictures and associated audio information: Video, Telecommunication Standardization Sector of ITU, Feb. 2000 (4 pages).

ITU-T Recommendation H.264, Series H: Audiovisual and Multimedia Systems (Infrastructure of audiovisual services—Coding of moving video), Advanced video coding for generic audiovisual services, Telecommunication Standardization Sector of ITU, Nov. 2007 (7 pages).

Office Action dated Aug. 16, 2011 in JP Application No. 2009-074983 and English-language translation thereof.

Hannuksela, Miska M.; *On NAL Unit Order*; Joint Video Team (JVT) of ISO/IEC MPEG & ITU-T VCEG (ISO/IEC JTC1/SC29/WG11 and ITU-T SG16 Q.6); 4$^{th}$ Meeting: Klagenfurt, Austria, Jul. 22-26, 2002.

Office Action dated Apr. 24, 2012 in JP Application No. 2009-074983 with English-language translation.

* cited by examiner

| Access unit delimiter |
|---|
| SPS (Sequence Parameter Set) |
| PPS (Picture Parameter Set) |
| Buffering period SEI |
| Picture timing SEI |
| Slice timing SEI |
| Slice data (1/n) |
| Slice timing SEI (Optional) |
| Slice data (2/n) |
| ... |
| Slice timing SEI (Optional) |
| Slice data (n/n) |

FIG.5

| |
|---|
| hrd_prameters() { |
| cpb_cnt_minus1 |
| bit_rate_scale |
| cpb_size_scale |
| for ( SchedSelIdx = 0; SchedSelIdx <= cpb_cnt_minus1; SchedSelIdx++ ) { |
| bit_rate_value_minus1[SchedSelIdx] |
| cpb_size_value_minus1[SchedSelIdx] |
| cbr_flag[SchedSelIdx] |
| } |
| initial_cpb_removal_delay_length_minus1 |
| cpb_removal_delay_length_minus1 |
| dpb_output_delay_length_minus1 |
| time_offset_length |
| } |

FIG.6

| |
|---|
| buffinrg_period( payloadSize) { |
| seq_parameter_set_id |
| if ( NalHrdBpPresentFlag ) { |
| for ( SchedSelIdx = 0; SchedSelIdx <= cpb_cnt_minus1; SchedSelIdx++ ) { |
| initial_cpb_removal_delay[SchedSelIdx] |
| initial_cpb_removal_delay_offset[SchedSelIdx] |
| } |
| } |
| if ( VclHrdBpPresentFlag ) { |
| for ( SchedSelIdx = 0; SchedSelIdx <= cpb_cnt_minus1; SchedSelIdx++ ) { |
| initial_cpb_removal_delay[SchedSelIdx] |
| initial_cpb_removal_delay_offset[SchedSelIdx] |
| } |
| } |
| } |

FIG.7

| pic_timing ( payloadSize) { |
|---|
| if ( CpbDpbDelaysPresentFlag ) |
|   cpb_removal_delay |
|   dpb_output_delay |
| } |
| ... |
| } |

FIG.8

| slice_timing ( payloadSize) { |
|---|
| slice_hrd_flag |
| if( slice_hrd_flag ) { |
|   if ( CpbDpbDelaysPresentFlag ) |
|     slice_cpb_removal_delay_offset |
| } |
| } |

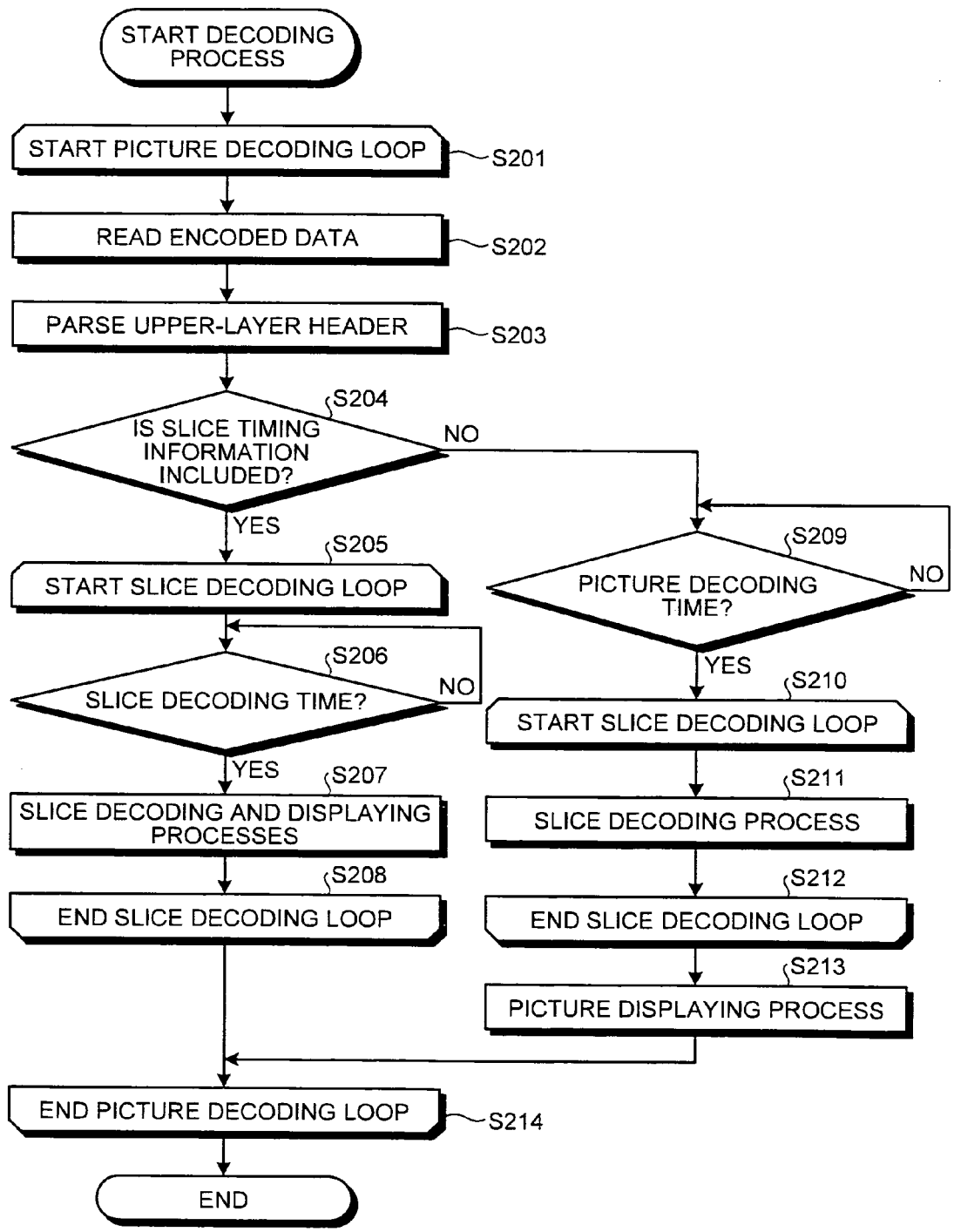

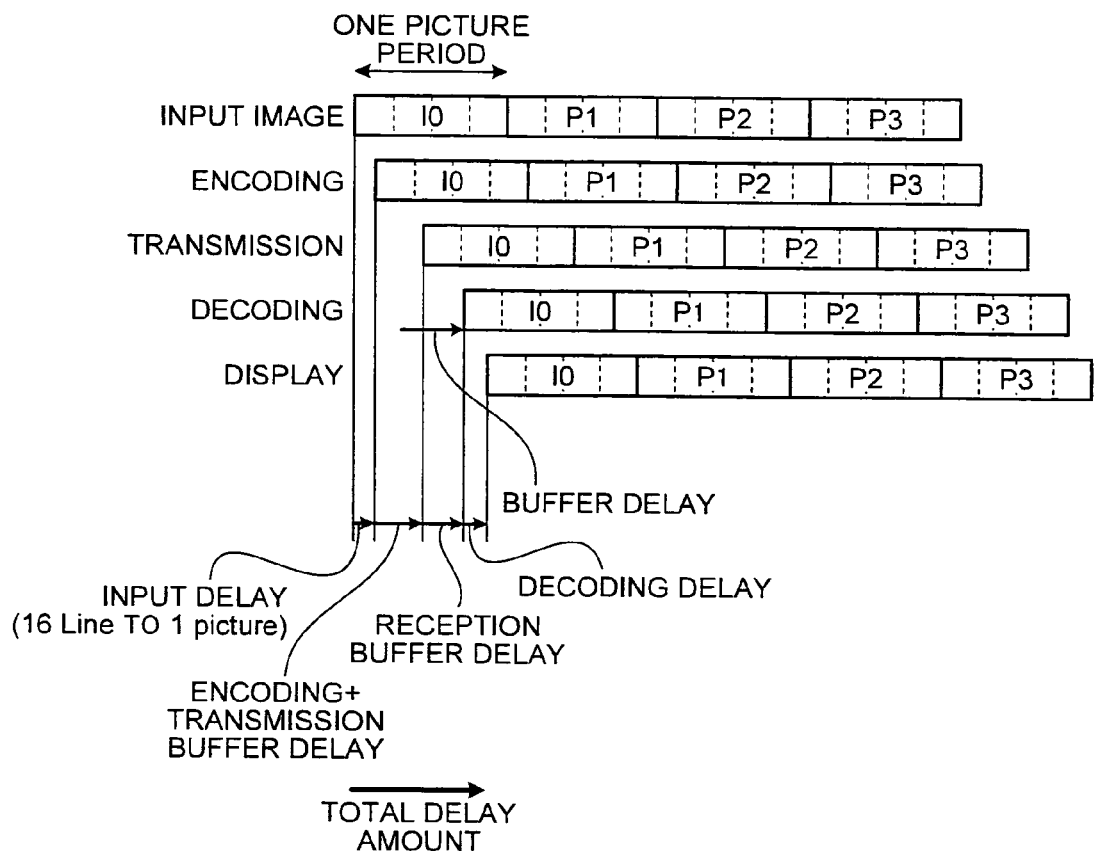

| Access unit delimiter |
| --- |
| SPS (Sequence Parameter Set) |
| Slice HRD Parameters |
| PPS (Picture Parameter Set) |
| Buffering period SEI |
| Slice Buffering Period SEI |
| Picture timing SEI |
| Slice timing SEI |
| Slice data (1/n) |
| Slice timing SEI (Optional) |
| Slice data (2/n) |
| ... |
| Slice timing SEI (Optional) |
| Slice data (n/n) |

FIG.19

| slice_hrd_prameters( ) { |
|---|
| slice_cpb_cnt_minus1 |
| bit_rate_scale |
| slice_cpb_size_scale |
| for ( SchedSelIdx = 0; SchedSelIdx <= slice_cpb_cnt_minus1; SchedSelIdx++ ) { |
|   bit_rate_value_minus1[SchedSelIdx] |
|   slice_cpb_size_value_minus1[SchedSelIdx] |
|   cbr_flag[SchedSelIdx] |
| } |
| slice_initial_cpb_removal_delay_length_minus1 |
| slice_cpb_removal_delay_length_minus1 |
| slice_dpb_output_delay_length_minus1 |
| slice_time_offset_length |
| } |

FIG.20

| slice_buffinrg_period( payloadSize) { |
|---|
| seq_parameter_set_id |
| if ( NalHrdBpPresentFlag ) { |
|   for ( SchedSelIdx = 0; SchedSelIdx <= cpb_cnt_minus1; SchedSelIdx++ ) { |
|     slice_initial_cpb_removal_delay[SchedSelIdx] |
|     slice_initial_cpb_removal_delay_offset[SchedSelIdx] |
|   } |
| } |
| if ( VclHrdBpPresentFlag ) { |
|   for ( SchedSelIdx = 0; SchedSelIdx <= cpb_cnt_minus1; SchedSelIdx++ ) { |
|     slice_initial_cpb_removal_delay[SchedSelIdx] |
|     slice_initial_cpb_removal_delay_offset[SchedSelIdx] |
|   } |
| } |
| } |

```
slice_timing ( payloadSize) {
  slice_hrd_flag
  if( slice_hrd_flag ) {
    if ( CpbDpbDelaysPresentFlag ) {
      slice_cpb_removal_delay
      slice_dpb_output_delay
    }
  }
}
```

IMAGE ENCODING METHOD AND IMAGE DECODING METHOD

CROSS-REFERENCE TO RELATED APPLICATIONS

This application is based upon and claims the benefit of priority from the prior Japanese Patent Application No. 2009-074983, filed on Mar. 25, 2009; the entire contents of which are incorporated herein by reference.

BACKGROUND OF THE INVENTION

1. Field of the Invention

The present invention relates to encoding and decoding processes of moving images.

2. Description of the Related Art

International Organization for Standardization (ISO)/International Electrotechnical Commission (IEC) 13818-2 (hereinafter, "Moving Picture Experts Group (MPEG) 2") and International Telecommunication Union-Telecommunication Standardization Sector (ITU-T) Recommendation H.264 (hereinafter, "H.264"), both of which are widely known as an international standard for moving image encoding processes, define an image frame or an image field, each of which is a unit of compression, as a "picture". Each "picture" is used as an access unit in encoding and decoding processes. In a normal encoding process, the code amount fluctuates for each of "pictures" depending on complexity of the image and the encoding mode being used (e.g., an intra-frame encoding mode, a forward prediction encoding mode, a bi-directional encoding mode).

To realize transmission and playback processes without problems while using a transmission channel having a fixed bit rate or a transmission channel for which the maximum transmission rate is determined, each of these international standards defines a virtual decoder model and prescribes that it is mandatory for an encoder to control the code amount fluctuation in units of "pictures" in such a manner that no overflow or underflow occurs in a reception buffer model of a virtual decoder. The virtual decoder model is called a Video Buffering Verifier (VBV) according to MPEG-2 and is called a Hypothetical Reference Decoder (HRD) according to H.264. A virtual reception buffer is called a VBV buffer in the VBV model and is called a Coded Picture Buffer (CPB) in the HRD model. In these virtual reception buffer models, operations that use "pictures" as access units are defined (hereinafter, the terms "picture" and "pictures" will be used without the quotation marks).

According to MPEG-2 and H.264, a total delay amount between a time at which a moving image signal is input and a time at which the moving image signal is compressed and transmitted, and then, decompressed and displayed on the reception side is normally at least hundreds of milliseconds to a number of seconds. It means a delay corresponding to a number of image frames (up to tens of image frames) occurs. For this reason, it is essential to realize low-delay processing in various usages that require immediacy, such as real-time image communications or video games.

In the VBV model according to MPEG-2 that is defined in ISO/IEC 13818-2 and the HRD model according to H.264 that is defined in ITU-T Recommendation H.264, a low-delay mode is provided in addition to a normal-delay mode (cf. JP-A H08-163559 (KOKAI)). In these low-delay modes in the reception buffer models, if all the pieces of encoded data related to a picture are stored in the reception buffer at a picture decoding time, the decoding process is started. On the contrary, if all the pieces of encoded data related to the picture have not yet been stored in the reception buffer at the picture decoding time, the decoding process is skipped, so that the picture is decoded and displayed at another picture decoding time immediately after all the pieces of encoded data related to the picture have been stored in the reception buffer.

The encoder calculates the number of skipped frames using the virtual reception buffer model and discards as many input pictures as the number of skipped frames that has been calculated. The low-delay models according to MPEG-2 and H.264 manage the virtual buffers in units of pictures. Thus, a compression/decompression delay corresponding to at least one picture occurs.

Also, for the HRD model according to H.264, a buffer model that simultaneously satisfies transmission models having a plurality of transmission bandwidths with respect to the same compressed data has been defined (cf. JP-A 2003-179665(KOKAI) and JP-A 2007-329953(KOKAI)). In the transmission models having the plurality of bandwidths, it is mandatory that an encoding process is performed so that the data is transmitted without any underflow or overflow in all of the plurality of transmission bandwidths. As the transmission bandwidth becomes larger, it is possible to reduce the transmission/reception buffer delay time period and to shorten the compression/decompression delay.

However, because it is necessary to guarantee the transmission in the transmission model having the smallest transmission bandwidth among the plurality of bandwidths, it is not possible to improve the image quality by effectively utilizing the bandwidths in the transmission channels having larger transmission bandwidths. In addition, like in the conventional reception buffer model according to MPEG-2 or the like, because buffer control is exercised in units of pictures, there is a limit to how much compression/decompression delay can be lowered.

As explained above, in the conventional moving image encoding methods according to MPEG-2, H.264, and the like, the transmission buffer delay caused by the virtual buffer model operating in units of pictures also occurs in addition to the delays in the encoding process and the decoding process. Thus, a large display delay occurs in real-time image transmission that involves compressions and decompressions. Furthermore, in the conventional low-delay modes, problems remain where frame skipping occurs and where it is necessary to use a transmission channel having a larger bandwidth than required by an encoded data amount.

SUMMARY OF THE INVENTION

According to one aspect of the present invention, an image encoding method includes outputting encoded data that includes an image code sequence corresponding to slices of a moving image and first timing information indicating times at which the slices are to be decoded.

According to another aspect of the present invention, an image decoding method includes receiving encoded data that includes an image code sequence corresponding to slices of a moving image and first timing information indicating times at which the slices are to be decoded; and decoding the image code sequence corresponding to the slices in accordance with decoding times indicated by the first timing information.

BRIEF DESCRIPTION OF THE DRAWINGS

FIG. 5 is a drawing explaining a detailed data structure of a "Sequence Parameter Set (SPS)";

FIG. 6 is a drawing explaining a detailed data structure of "Buffering period Supplemental Enhancement Information (SEI)";

FIG. 7 is a drawing explaining a detailed data structure of "Picture timing SEI";

FIG. 8 is a drawing explaining a detailed data structure of "Slice timing SEI";

FIG. 14 is a flowchart of a decoding process performed by the decoder according to the first embodiment;

FIG. 15 is a drawing explaining compression/decompression delays occurring in the encoder and the decoder according to the first embodiment;

FIG. 16 is a drawing explaining a data structure of "Slice timing SEI" according to a first modification example of the first embodiment;

FIG. 19 is a drawing explaining a detailed data structure of "Slice Hypothetical Reference Decoder (HRD) Parameters";

FIG. 20 is a drawing explaining a detailed data structure of "Slice Buffering Period SEI";

DETAILED DESCRIPTION OF THE INVENTION

Figure 1:
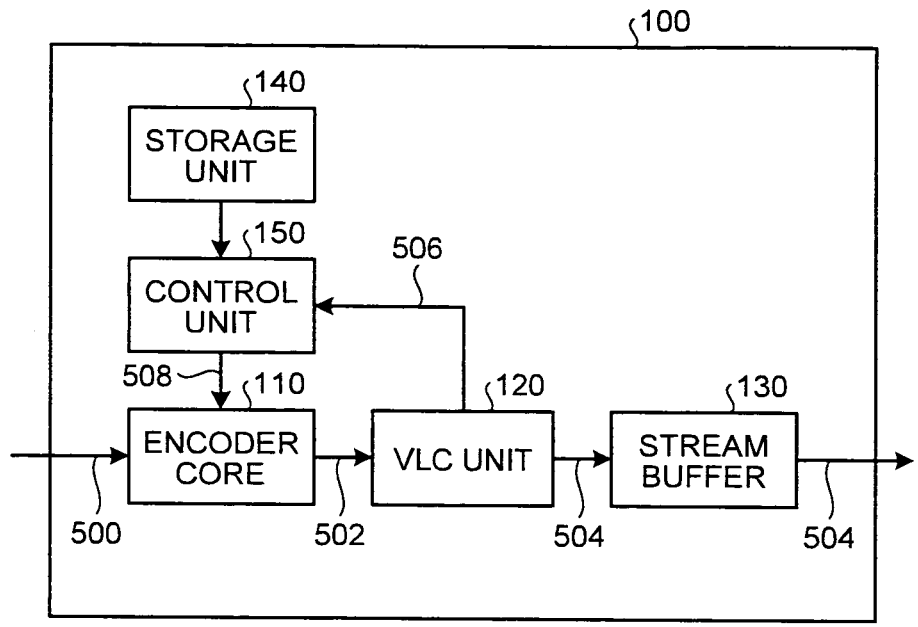
FIG. 1 is a block diagram showing an encoder according to a first embodiment of the present invention.

Exemplary embodiments of the present invention will be explained. An encoder according to a first embodiment of the present invention performs a moving image encoding process that uses intra-frame predictions or inter-frame predictions. Also, during the encoding process, the encoder generates and outputs encoded data that a decoder is able to decode and display not only in units of pictures, but also in units of slices. As shown in FIG. 1, an encoder 100 includes an encoder core 110; a Variable Length Code (VLC) unit 120; a stream buffer 130; a storage unit 140; and a control unit 150. Under the control of the control unit 150, the encoder core 110 acquires an input image signal 500 and divides the input image signal 500 into slices. Further, the encoder core 110 performs signal processing, such as a Discrete Cosine Transform (DCT), that is related to the encoding process.

The VLC unit 120 acquires data 502 resulting from the process performed by the encoder core 110, performs an entropy encoding process such as a variable length encoding process or an arithmetic encoding process in units of slices, and acquires encoded data. The data 502 contains data that needs to be encoded such as timing information indicating times at which the encoded data should be decoded in units of slices and timing information indicating times at which the encoded data should be decoded in units of pictures, in addition to information indicating a result of the signal processing such as a DCT coefficient. The timing information will be explained later. The encoded data 504 acquired as a result of the entropy encoding process is output via the stream buffer 130. The VLC unit 120 also outputs code amount information 506 indicating a generated code amount resulting from the entropy encoding process to the control unit 150.

The storage unit 140 stores therein two virtual buffer models that are namely a virtual buffer model operating in units of slices and a virtual buffer model operating in units of pictures. The virtual buffer model operating in units of pictures is a buffer mode in which encoded data related to each picture is used as a unit of output. The virtual buffer model operating in units of slices is a buffer model in which encoded data related to each slice is used as a unit of output. "Slices" are units that form a "picture". In this embodiment, "in units of slices" may be in units of single slices or may be in units each of which is made up of a plurality of slices and is smaller than a picture. More specifically, the storage unit 140 stores therein a buffer size x1 for the virtual buffer model operating in units of slices and a buffer size x2 (where x1<x2) for the virtual buffer model operating in units of pictures. The virtual buffer model operating in units of pictures corresponds to a second virtual buffer model, whereas the virtual buffer model operating in units of slices corresponds to a first virtual buffer model.

The control unit 150 exercises control of the encoder core 110. More specifically, the control unit 150 calculates buffer occupancy fluctuation amounts for the virtual buffer model operating in units of slices and for the virtual buffer model operating in units of pictures, based on the buffer sizes of the virtual buffer models stored in the storage unit 140 and the code amount information acquired from the VLC unit 120. In other words, the control unit 150 includes a calculator that calculates the buffer occupancy fluctuation amounts. Based on the buffer occupancy fluctuation amounts, the control unit 150 generates control information 508 for controlling the data amount of the encoded data and forwards the generated control information 508 to the encoder core 110. More specifically, the control information is information used for adjusting a quantization parameter for an orthogonal transform coefficient. The control information may further contain information related to feedback control of the generated code amount, such as stuffing data insertions, pre-filter control, and quantization matrix control.

Figure 2:
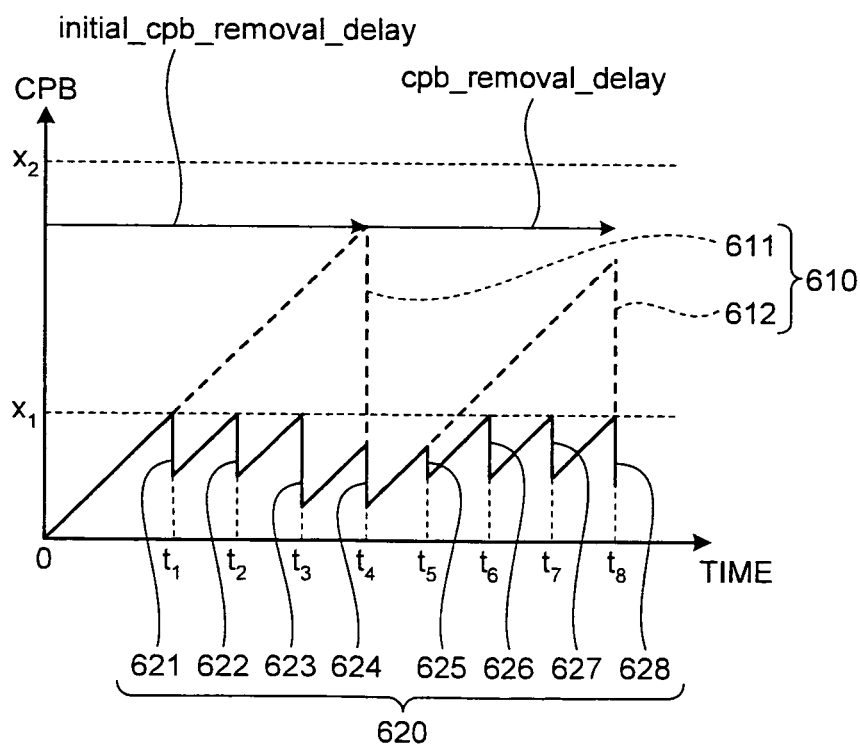
FIG. 2 is a drawing explaining an example of operations performed by a first virtual buffer model and a second virtual buffer model when having received encoded data.

FIG. 2 is an example of operations performed by the two virtual buffer models (i.e., virtual reception buffer models) when having received the encoded data. The horizontal axis of the chart shown in FIG. 2 expresses time, whereas the vertical axis of the chart expresses the buffer occupancy amount. The virtual buffer corresponds to a Coded Picture Buffer (CPB) according to H.264 and corresponds to a Video Buffering Verifier (VBV) according to MPEG-2. In the description of the first embodiment, an example in which a CPB is used according to H.264 will be explained.

In FIG. 2, "x2" denotes the buffer size in the virtual buffer model operating in units of pictures, whereas "x1" denotes the buffer size in the virtual buffer model operating in units of slices. A dotted line 610 indicates encoded data in the virtual buffer model operating in units of pictures. A solid line 620 indicates encoded data in the virtual buffer model operating in units of slices. For the sake of convenience in explanation, an example in which four slices form one picture is shown in FIG. 2.

In the virtual buffer model operating in units of pictures, encoded data 611 related to a first picture is stored in the virtual buffer until a time t4, which is a decoding time of the first picture, and is instantly output at the time t4 so that a decoding process is performed thereon. Similarly, encoded data 612 related to a second picture is stored in the virtual buffer until a decoding time t8 and is instantly output at the time t8 so that a decoding process is performed thereon. This operation corresponds to the conventional model.

The control unit 150 acquires the buffer size x2 of the virtual buffer model operating in units of pictures from the storage unit 140. Further, the control unit 150 controls the data amount of the encoded data that is in units of pictures in such a manner that no overflow or underflow occurs in the operation of the virtual buffer model described above, with respect to the buffer size x2.

In the virtual buffer model operating in units of slices, encoded data 621 related to a first slice is stored in the virtual buffer until a time t1, which is a decoding time of the first slice, and is instantly output at the time t1 so that a decoding process is performed thereon. Similarly, encoded data 622 related to a second slice is stored in the virtual buffer until a decoding time t2 and is instantly output at the time t2 so that a decoding process is performed thereon.

The control unit 150 acquires the buffer size x1 of the virtual buffer model operating in units of slices from the storage unit 140. Further, the control unit 150 controls the data amount of the encoded data that is in units of slices in such a manner that no overflow or underflow occurs in the operation of the virtual buffer model described above, with respect to the buffer size x1.

The control unit 150 further generates timing information indicating times at which the encoded data should be decoded during the decoding processes. The timing information includes two types of timing information that are namely timing information in units of pictures indicating decoding times for the virtual buffer model operating in units of pictures and timing information in units of slices indicating decoding times for the virtual buffer model operating in units of slices.

Figures 3, 4:
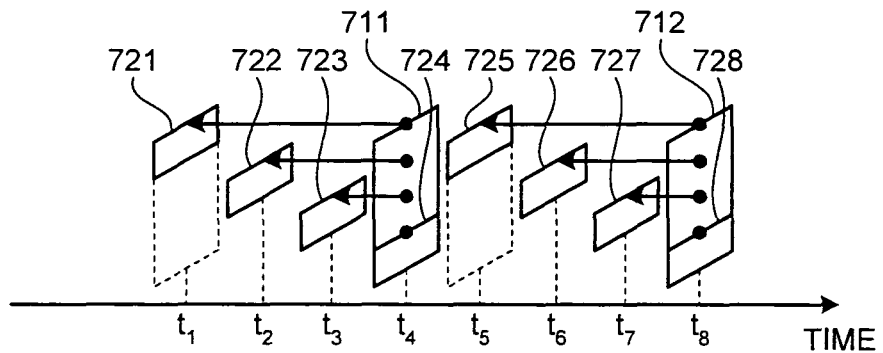
FIG. 3 is a drawing explaining timing information.
FIG. 4 is a drawing explaining a data structure of encoded data corresponding to one picture that has been generated by the encoder according to the first embodiment.

FIG. 3 is a drawing of a timing model for decoding and displaying processes performed in the virtual buffer models operating in units of pictures and in units of slices. In this timing model, the encoded data is instantly decoded and is displayed at the same time as being decoded, in both of the virtual buffer models. It should be noted that a time ti (i=1, 2, . . . ) corresponds to the time ti shown in FIG. 2.

A decoded image 711 and another decoded image 712 shown in FIG. 3 are decoded images acquired from the encoded data of the first picture and the encoded data of the second picture indicated with the dotted lines 611 and 612, respectively, in the virtual buffer model 610 shown in FIG. 2. The control unit 150 uses the time t4, which is a time at which the first picture should be decoded, and the time t8, which is a time at which the second picture should be decoded, as the timing information in units of pictures. The control unit 150 generates and outputs, as the timing information in units of pictures, the timing information indicating the times at which the encoded data should be decoded, together with the encoded data that is in units of pictures.

In the case where a fixed length frame rate is used, the control unit 150 generates the timing information in units of pictures in accordance with the frame rate. In contrast, in the case where a variable frame rate is used, the control unit 150 generates the timing information in accordance with a time at which the input image signal 500 is input.

Decoded images 721, 722, 723, and 724 shown in FIG. 3 are decoded images acquired from the encoded data of the first to the fourth slices indicated with the solid lines 621, 622, 623, and 624, respectively, in the virtual buffer model 620 operating in units of slices indicated with the solid line in FIG. 2. As the timing information in units of slices, the control unit 150 generates the timing information indicating the times at which the slices should be decoded, such as the time t1 at which the first slice should be decoded and the time t2 at which the second slice should be decoded. In other words, the control unit 150 generates and outputs, as the timing information in units of slices, the timing information indicating the time at which the encoded data should be decoded, together with the encoded data corresponding to each slice.

More specifically, using the timing information in units of pictures, the control unit 150 defines each of the times at which a different one of the slices should be decoded as a difference value from the time at which the picture including the slice should be decoded. For example, each of the times t1 to t4 shown in FIG. 3 at which the first slice 721 to the fourth slice 724 should be decoded, respectively, is defined as a difference from the time t4, while using the time t4 at which the first picture should be decoded as a reference. As another example, each of times t5, t6, t7, and t8 at which a fifth slice 725 to an eighth slice 728 should be decoded, respectively, is defined as a difference from the time t8, while using the time t8 at which the second picture should be decoded as a reference. The time t4 at which the fourth slice 724 should be decoded is equal to the time t4 at which the first picture should be decoded, and the difference is therefore "0". Similarly, the time at which the eighth slice 728 should be decoded is equal to the time at which the second picture should be decoded, and the difference is therefore "0".

Displaying times in the virtual buffer model operating in units of pictures and in the virtual buffer model operating in units of slices correspond to display starting times of the picture and of the slice, respectively. For example, in the case of the first picture shown in FIG. 2, the display starts at the time t4 in the virtual buffer model operating in units of pictures, whereas the display starts at the time t1 in the virtual buffer model operating in units of slices. As a result, in the case where the operation is performed in accordance with the buffer model operating in units of slices, it is possible to play back the image with a lower delay than in the case where the operation is performed in accordance with the buffer model operating in units of pictures.

In actuality, each picture is displayed for the duration of one picture period starting at a display starting time. When the displaying process is performed in units of pictures, each picture is decoded and displayed by scanning the encoded data corresponding to the picture in a main scanning direction, which is from the top to the bottom of a screen, while scanning the encoded data in a sub-scanning direction, which is from the left-hand side to the right-hand side of the screen. Similarly, when the displaying process is performed in units of slices, each picture is decoded and displayed by scanning the encoded data in the main direction while scanning the encoded data in the sub-scanning direction, in units of slices. When the display of one slice has been completed, the display of the next slice starts. As a result, the process of displaying each picture by scanning in the sub-scanning direction and the main scanning direction starting from an upper part of the screen is the same, regardless of whether the displaying process is performed in units of pictures or in units of slices.

The encoder 100 according to the first embodiment generates and outputs the encoded data to which the timing information for the virtual buffer model operating in units of slices is attached, in addition to the conventional timing information for the virtual buffer model operating in units of pictures. As a result, during the decoding processes, it is possible to control the decoding times in units of slices. Thus, it is possible to decode and display images with lower delays. Further, because not only the timing information in units of slices but also the timing information in units of pictures is attached, it is also possible to decode the encoded data by allowing a conventional device that controls the decoding times in units of pictures to perform the processes using the conventional method.

Next, a data structure of the encoded data corresponding to one picture that has been generated by the encoder 100 will be explained. As shown in FIG. 4, the encoded data includes an "Access Unit Delimiter", a "Sequence Parameter Set (SPS)", a "Picture Parameter Set (PPS)", "Buffering period Supplemental Enhancement Information (SEI)", and "Picture timing SEI". Further, following these pieces of information, sets each of which is made up of "Slice timing SEI" and "Slice data" are also included in the encoded data, the total quantity of the sets being equal to the number of slices (n) contained in the one picture.

The "Access Unit Delimiter" is information indicating a picture boundary position. The "Sequence Parameter Set (SPS)" are parameters related to a video sequence. More specifically, the "Sequence Parameter Set (SPS)" includes a buffer size and bit rate information of the virtual buffer operating in units of pictures or in units of slices. The "Picture Parameter Set (PPS)" are parameters related to the picture. The "Buffering period Supplemental Enhancement Information (SEI)" is timing information for initializing the virtual buffer model operating in units of pictures or in units of slices. More specifically, the "Buffering period SEI" includes information indicating an initial delay time period for the virtual buffer operating in units of pictures or in units of slices.

The "Picture timing SEI" is timing information indicating the decoding and displaying time in the virtual buffer model operating in units of pictures. The "Slice timing SEI" is timing information indicating the decoding and displaying time in the virtual buffer model operating in units of slices. The "Slice data" is compressed image data corresponding to a different one of the slices that are acquired by dividing the picture into n sections (where n≥1 is satisfied).

The data structure of the encoded data is not limited to the exemplary structure described above. For example, another arrangement is acceptable in which the "SPS" and the "Buffering period SEI" are attached to each of units of random accesses starting with an intra-frame encoded picture, instead of being attached to each of all the pictures. The "units of random accesses" correspond to "Group Of Pictures (GOP)" according to MPEG-2.

Alternatively, yet another arrangement is acceptable in which one "PPS" is attached to each group that is made up of a plurality of pictures. Yet another arrangement is acceptable in which the "Slice timing SEI" is attached to each of all the pieces of slice encoded data that are namely "Slice data (1/n) to (n/n)". As yet another arrangement, the "Slice timing SEI" may be attached only to the first slice that is namely "Slice data (1/n)". As yet another arrangement, the "Slice timing SEI" may be attached to each group that is made up of a plurality of slices.

The pieces of data shown in FIG. 4 other than the "Slice timing SEI" are described in H.264. However, these are merely examples, and the data structure is not limited to the one according to H.264.

The "SPS" includes a parameter related to a virtual decoder model according to H.264 called Hypothetical Reference Decoder (HRD). Information "hrd_parameters( )" shown in FIG. 5 defines a parameter for the HRD. For the HRD, a virtual reception buffer model called a CPB model is defined. In the "hrd_parameters( )", information "cpb_cnt_minus1" denotes a value acquired by subtracting "1" from "the number of virtual reception buffer models to be transmitted". Information "cpb_size_value_minus1" and information "bit_rate_value_minus1" denote the buffer size of each virtual buffer model and the input bit rate to the virtual buffer model, respectively.

As explained above, according to H.264, it is possible to encode one or more CPB model parameters within the same encoded data. In the case where a plurality of buffer model parameters is encoded, it is mandatory that such encoded data is generated that causes no buffer underflow or overflow from any of the model parameters. The CPB model according to H.264 is a buffer model that uses the pieces of picture encoded data as units of operation that are indicated with the dotted lines in the virtual buffer model shown in FIG. 2. The buffer size x2 used in the virtual buffer model operating in units of pictures shown in FIG. 2 denotes the CPB buffer size and is encoded as the "cpb_size_value_minus1" in the "hrd_parameters( )".

An initial delay parameter in one or more virtual reception buffer models is encoded as the "Buffering period SEI" shown in FIG. 4. Normally, the initial delay parameter is encoded for each of points (called random access points) at which it is possible to start playing back the encoded data. Information "initial_cpb_removal_delay" shown in FIG. 6 is the same as information "initial_cpb_removal_delay" shown in FIG. 2 and denotes an initial delay time period in the virtual reception buffer.

The "Picture timing SEI" shown in FIG. 4 includes timing information indicating a decoding and displaying time of each encoded picture. Information "cpb_removal_delay" shown in FIG. 7 is the same as information "cpb_removal_delay" shown in FIG. 2 and denotes the timing information indicating the decoding time of the picture. Further, information "dpb_output_delay" denotes a difference between the picture decoding time and the picture displaying time. In the case where the picture decoding time is the same as the picture displaying time, "0" is set as the "dpb_output_delay".

Next, the "Slice timing SEI" shown in FIG. 4 will be explained in detail. Information "slice_hrd_flag" shown in FIG. 8 is a flag indicating that the virtual buffer model operating in units of slices is valid, in addition to the virtual reception buffer model operating in units of pictures. According to the first embodiment, only one virtual reception buffer model operating in units of pictures and only one virtual reception buffer model operating in units of slices are used. The information "cpb_cnt_minus1" shown in FIG. 5 denotes the value acquired by subtracting "1" from the number of virtual reception buffer models. In the case where the "slice_hrd_flag" is valid, the value indicated by the "cpb_cnt_minus1" is "0".

In addition, it is assumed that the buffer size of the virtual reception buffer operating in units of pictures is equal to the buffer size of the virtual reception buffer operating in units of slices. The information "cpb_size_value_minus1" shown in FIG. 5 indicates this buffer size. Information "slice_cpb_removal_delay_offset" shown in FIG. 8 denotes timing information in units of slices that indicates the time at which the slice should be decoded. As explained above, the information "slice_cpb_removal_delay_offset" indicates the timing information in units of slices that is expressed as a difference from the time at which the picture including the slice should be decoded in the virtual buffer model operating in units of pictures (i.e., a difference from the decoding time of the picture).

In the virtual buffer model operating in units of slices, the decoding process is started earlier than in the virtual buffer model operating in units of pictures. The larger the value of the "slice_cpb_removal_delay_offset" is, the earlier the decode starting time is. It is possible to calculate the decoding time in the virtual buffer model operating in units of pictures based on the "initial_cpb_removal_delay" and the "cpb_removal_delay" by using the same method as the one described in ITU-T Recommendation H.264.

Next, a process for calculating the decoding times in the virtual buffer model operating in units of slices will be explained. By using Formula (1) shown as Expression (3) below, the control unit 150 included in the encoder 100 calculates "slice_cpb_removal_delay_offset(i)" based on the decode starting time of an i'th slice in a picture n, which can be expressed by Expression (1) below. Also, by using Formula (1) shown as Expression (3) below, a control unit for the decoder calculates the decode starting time of the i'th slice in the picture n, which can be expressed by Expression (2) below, based on the "slice_cpb_removal_delay_offset(i)" that has been received.

$$ts^i_r(n) \qquad \text{Expression (1)}$$

$$ts^i_r(n) \qquad \text{Expression (2)}$$

Formula(1)

$$ts^i_r(n) = t_r(n) - t_c \times \text{slice\_cpb\_removal\_delay\_offset}(i)(1) \quad \text{Expression (3)}$$

The term "tr(n)" denotes a decode starting time in the virtual buffer model operating in units of pictures. The term "slice_cpb_removal_delay_offset(i)" is timing information indicating the time at which the slice i should be decoded (i.e., the decoding time of the slice i), which is encoded in the "Slice timing SEI". The term "tc" is a constant that indicates the unit time period used in the timing information.

Alternatively, another arrangement is also acceptable in which the control unit for the decoder calculates the decode starting time of the slice to be played back first (i.e., the first slice) among the plurality of slices contained in any one of the pictures, based on the "Slice timing SEI" and calculates the decode starting times of the second slice and the later slices in the picture based on the number of pixels or the number of macro blocks that have already been decoded in the picture. In other words, the control unit 150 included in the encoder 100 may calculate "slice_cpb_removal_delay_offset(0)" based on the decode starting time of the first slice in any one of the pictures. Accordingly, by using Formula (2) shown as Expression (5) below, the control unit for the decoder may calculate the decode starting time of the i'th slice in the picture, which can be expressed by Expression (4) below, based on the "slice_cpb_removal_delay_offset(0)" that has been received.

$$ts^i_r(n) \qquad \text{Expression (4)}$$

Formula (2)

$$ts^i_r(n) = t_r(n) - t_c \times \text{slice\_cpb\_removal\_delay\_offset}(0) + \Delta t_r \times \frac{\sum_{k=0}^{i-1} MBS(k)}{TMB} \qquad \text{Expression (5)}$$
$$(2)$$

In Formula (2) above, the term "tr(n)" denotes the decode starting time of the picture n to which the slice belongs, in the virtual buffer model operating in units of pictures. The term "slice_cpb_removal_delay_offset(0)" denotes the timing information related to the decoding time of the first slice in the picture, which is encoded in the "Slice timing SEI". The term "Δtr" denotes a decoding or display interval of the one picture. The term "TMB" denotes the total number of macro blocks in the one picture. The term that is separately shown in Expression (6) below denotes the total number of macro blocks from a slice 0 to a slice i−1 in the picture. The term MBS(k) denotes the number of macro blocks that belong to a k'th slice.

$$\sum_{k=0}^{i-1} MBS(k) \qquad \text{Expression (6)}$$

When an image having a fixed frame rate is used, the control unit 150 included in the encoder 100 configures "slice_cpb_removal_delay_offset(0)" for the first slice in each of all the pictures included in a piece of encoded data so as to be constant. Also, by using Formula (1) shown above, the control unit 150 included in the encoder 100 calculates "slice_cpb_removal_delay_offset(i)" related to the second slice and the later slices in the picture so as to be equal (or so as to be close enough, with a difference smaller than a predetermined value) to the decode starting time of the i'th slice, which can be calculated by using Formula (2) shown above. As a result, the information is encoded as the "Slice timing SEI" only for the first slice in the picture at the playback starting point. Thus, it is possible to calculate, on the reception side (i.e., the control unit for the decoder), the decode starting time of each of the slices in the virtual buffer model operating in units of slices.

Figure 9:
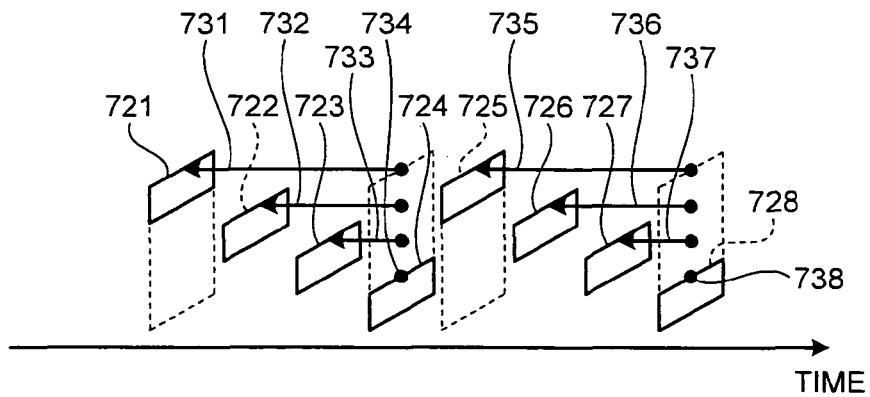
FIG. 9 is a drawing explaining a situation in which encoded data related to a slice is lost during a transmission.

To realize a playback operation starting with an arbitrary picture, it is necessary to encode the "Slice timing SEI" only for at least the first slice in each of the pictures. For example, only pieces of timing information 731 and 735 for the decoded images 721 and 725 shown in FIG. 9 are encoded. In contrast, pieces of timing information 732, 733, 734, 736, 737, and 738 for the decoded images 722, 723, 724, 726, 727, and 728 are not encoded, but it is possible to calculate the decoding times by using Formula (2) on the reception side.

Alternatively, another arrangement is acceptable in which "Slice timing SEI" for each of all the slices is attached. With this arrangement, it is possible to easily acquire, on the reception side, the decode starting times of the slices out of the encoded data, without having to perform the calculation shown in Formula (2). In the case where "Slice timing SEI" is attached to each of all the slices, even if data is lost in units of slices on the reception side due to a transmission error or a packet loss, it is possible to start a decoding process at an appropriate time, beginning with an arbitrary slice. Thus, error resistance level is also improved. For example, a case will be described in which the pieces of timing information 731, 735, and 738 for the decoded images 721, 725, and 728, as shown in FIG. 9, are lost during a data transmission. During the decoding process, it is possible to decode slices 722, 723, 724, 726 and 727 at the correct timing based on the pieces of timing information 732, 733, 734, 736 and 737 that have properly been received. Consequently, it is possible to start the decoding processes at the appropriate times and to properly play back the images without any overflow or underflow in the virtual reception buffer and without any delays in the display.

Figure 10:
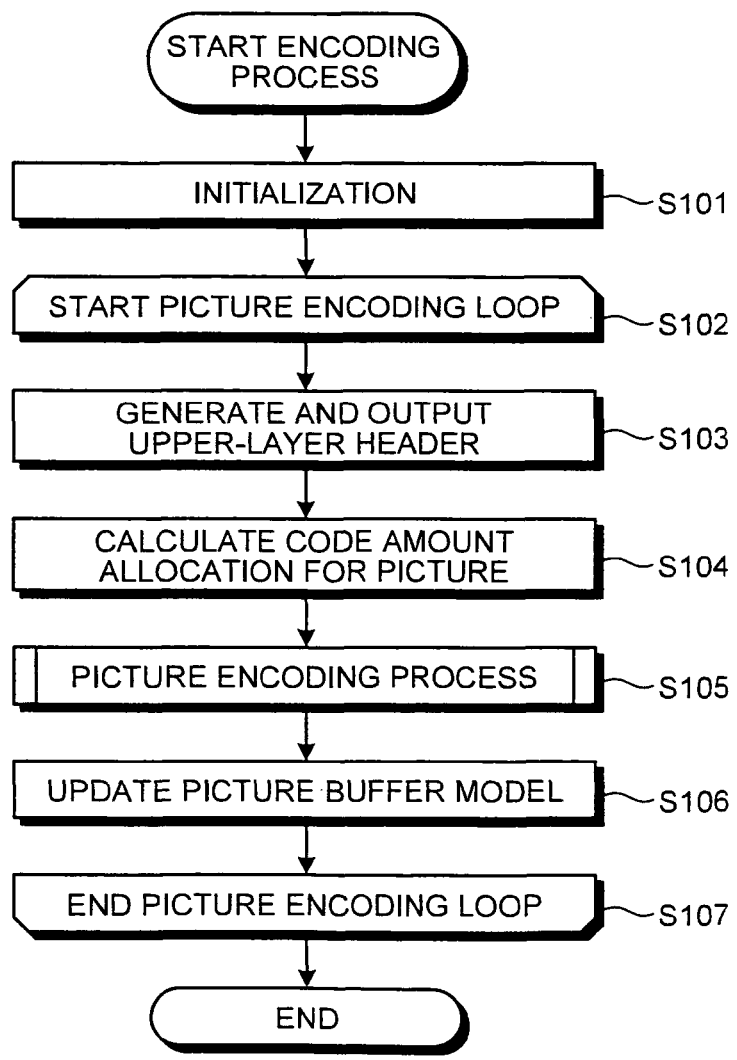
FIG. 10 is a flowchart of an encoding process performed by the encoder according to the first embodiment.

Next, the encoding process performed by the encoder 100 will be explained, with reference to FIGS. 10 to 12. As shown in FIG. 10, when an encoding process starts, the control unit 150 performs an initialization process (step S101). More specifically, parameters related to the image size, the bit rate, the virtual buffer sizes, and the like are set. As the virtual buffer sizes, a virtual buffer size is set for each of the first and the second virtual buffer models.

Subsequently, a picture encoding loop process starts (step S102). In the picture encoding loop process, per an instruction from the control unit 150, the encoder core 110 generates and outputs upper-layer headers that are above a picture layer in the encoded data, such as the "Access Unit Delimiter", the "Sequence Parameter Set (SPS)", the "Picture Parameter Set (PPS)", the "Buffering period SEI", and the "Picture timing SEI", for all the pictures or for every periodical picture unit (step S103).

After that, the control unit 150 calculates an allocated code amount for the picture to be encoded under the condition that no overflow or underflow occurs in the virtual buffer operating in units of pictures (step S104). After that, under the control of the control unit 150, the encoder core 110 performs a regular encoding process, which is signal processing related to the encoding process. Subsequently, the VLC unit 120 performs the entropy encoding process on the data 502 that has been acquired from the encoder core 110 and acquires encoded data (step S105).

When the encoding process on the one picture has been finished, the control unit 150 acquires code amount information indicating a generated code amount from the VLC unit 120. The control unit 150 then updates the buffer occupancy amount for the virtual buffer model operating in units of pictures, based on the generated code amount of the picture on which the encoding process has been finished (step S106). When encoding processes have been completed for a predetermined number of frames or when a stop-encoding instruction has been received from an external source, the picture encoding loop process ends (step S107). The encoding process is thus completed.

Figure 11:
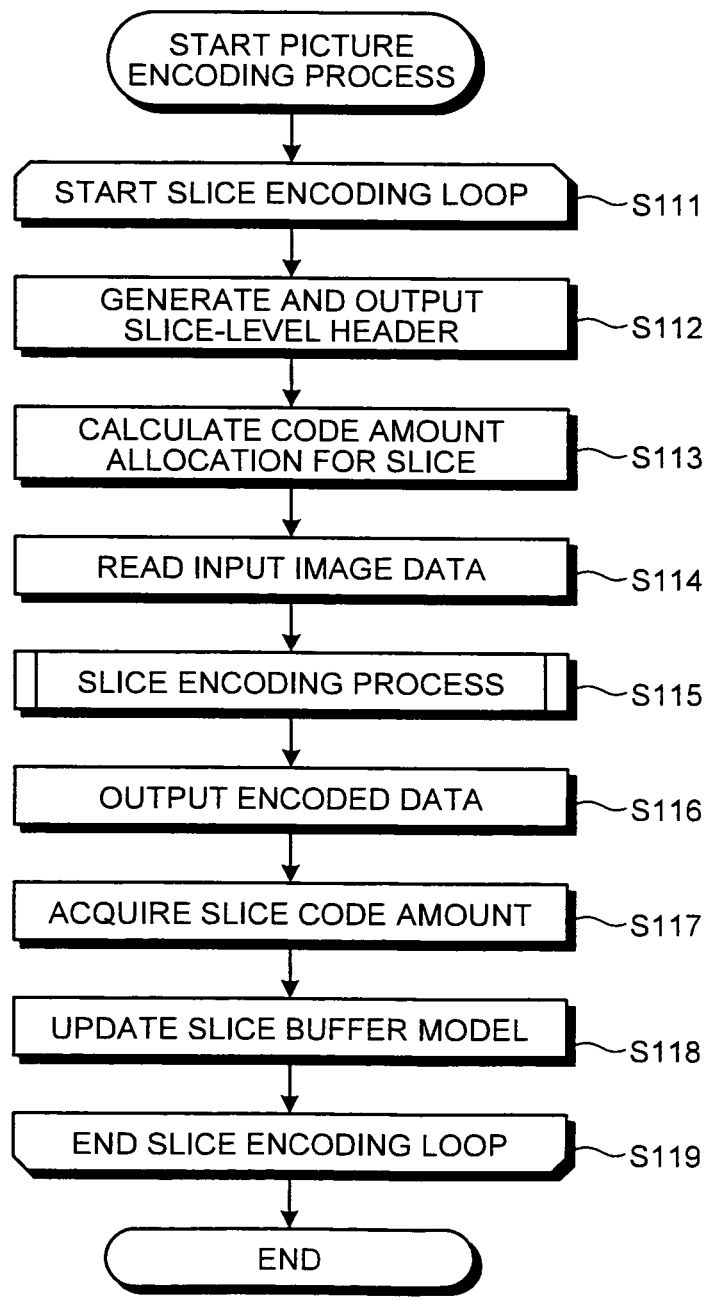
FIG. 11 is a flowchart of a detailed procedure in a picture encoding process (step S105)

As shown in FIG. 11, in the picture encoding process (at step S105) shown in FIG. 10, a slice encoding loop process starts (step S111). The encoder core 110 divides one picture into two or more slices and sequentially encodes the slices. More specifically, under the control of the control unit 150, the encoder core 110 refers to, for example, the virtual buffer model operating in units of slices that is stored in the storage unit 140 and generates and outputs header information such as the "Slice timing SEI" related to a slice (step S112). After that, the control unit 150 calculates an allocated code amount of the slice under the condition that no overflow or underflow occurs in the virtual buffer operating in units of slices (step S113). Subsequently, the encoder core 110 reads an input image signal that is a target of the encoding process (step S114) so that the encoder core 110 and the VLC unit 120 perform an encoding process on the slice (step S115). When the encoding process has been completed for the one slice, the encoded data of the slice is output via the stream buffer 130 (step S116).

After that, the control unit 150 acquires a generated code amount of the slice (step S117) and updates the buffer occupancy amount for the virtual buffer model operating in units of slices (step S118). When the encoding process has been completed for all the slices that form one picture, the encoding process for the picture has been finished (step S119). The picture encoding process is thus finished (step S105).

Figure 12:
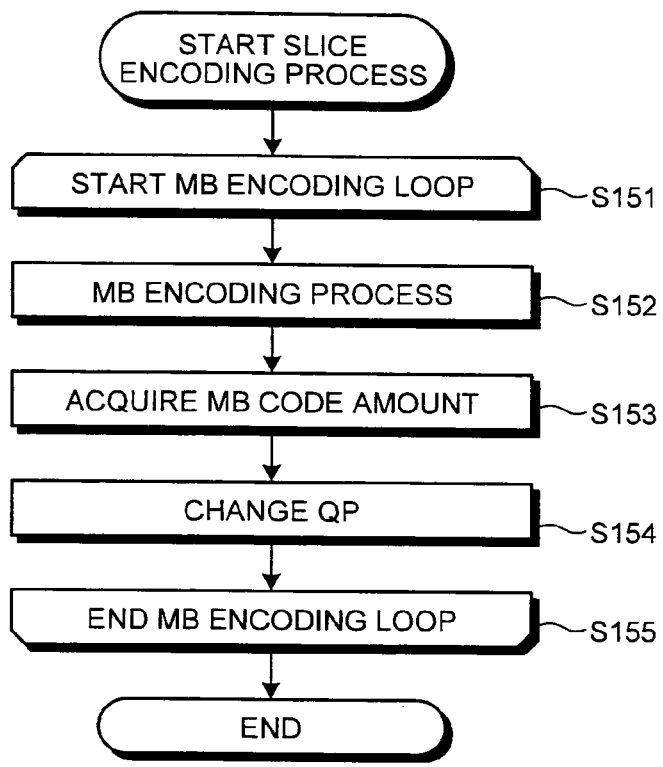
FIG. 12 is a flowchart of a detailed procedure in a slice encoding process (step S115)

As shown in FIG. 12, in the slice encoding process (at step S115) shown in FIG. 11, a Macro Block (MB) encoding loop process starts (step S151). More specifically, the encoder core 110 first performs an encoding process that uses an intra-frame prediction or an inter-frame prediction on each of the macro blocks that form the slice (step S152). Every time the encoder core 110 has encoded one macro block, the control unit 150 acquires a generated code amount of the macro block (step S153). Further, the control unit 150 exercises code amount control by updating a quantization parameter QP so that the generated code amount of the slice becomes equal to the code amount allocated to the slice (step S154). When the process has been completed for all the macro blocks that form the slice, the encoding process for the slice has been finished (step S155). The slice encoding process (step S115) is thus finished.

As explained above, the encoder 100 according to the first embodiment generates the encoded data that includes the timing information in units of pictures and the timing information in units of slices. Thus, a decoder that is capable of controlling the decode starting times in units of slices is able to control the decode starting times in units of slices. As a result, it is possible to perform the decoding and the displaying processes with lower delays than in the virtual buffer model operating in units of pictures. In addition, because the timing information in units of pictures is also included, a conventional decoder that is not capable of controlling the decode starting times in units of slices is able to perform the decoding and the displaying processes using a virtual buffer model operating in units of pictures, like in the conventional example.

Figure 13:
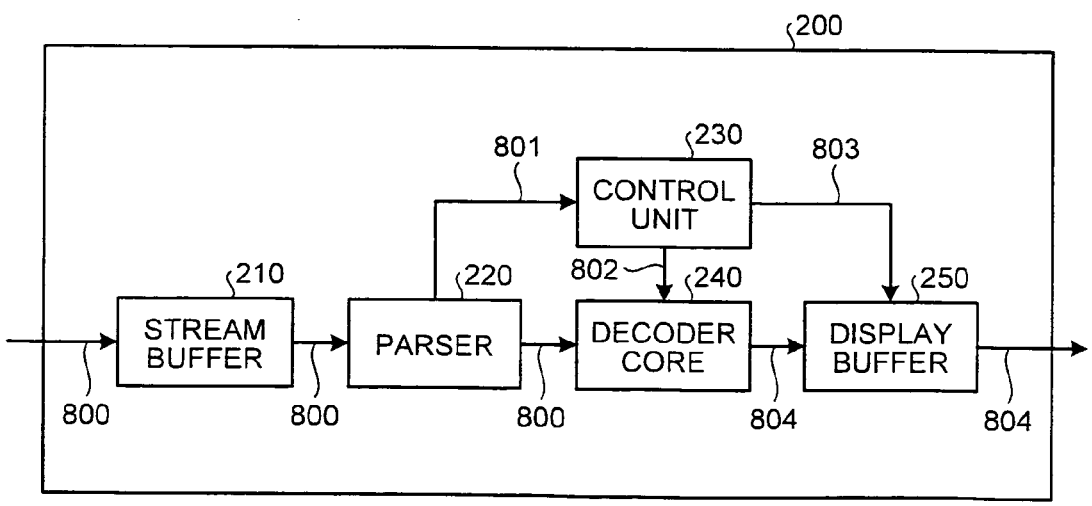
FIG. 13 is a block diagram of a decoder according to the first embodiment.

Next, the decoder that acquires encoded data and decodes and displays the acquired encoded data will be explained. The decoder according to the first embodiment is capable of controlling both decoding and displaying times in units of slices and decoding and displaying times in units of pictures. As shown in FIG. 13, a decoder 200 includes a stream buffer 210, a parser 220, a control unit 230, a decoder core 240, and a display buffer 250.

Encoded data 800 is input to the stream buffer 210 and is forwarded to the parser 220. The parser 220 parses the encoded data having the data structure explained with reference to FIGS. 4 to 8. As a result, the parser 220 extracts the timing information for the virtual buffer model operating in units of pictures and the timing information for the virtual buffer model operating in units of slices and outputs the two types of timing information 801 to the control unit 230. Based on the acquired timing information 801, the control unit 230 determines which one of the two models (i.e., the virtual buffer model operating in units of pictures and the virtual buffer model operating in units of slices) should be used in the decoding and the displaying processes and outputs pieces of control information 802 and 803 used for controlling the decoding and displaying times to the decoder core 240 and to the display buffer 250, respectively.

More specifically, in the case where the encoded data 800 includes no valid decode timing information in units of slices, in other words, in the case where "Slice timing SEI" is not included in the encoded data 800, or in the case where "slice_hrd_flag" is "0", the control unit 230 controls decoding times and displaying times in units of pictures, based on the decode timing information in units of pictures. In contrast, in the case where the encoded data 800 includes valid decode timing information in units of slices, in other words, in the case where "Slice timing SEI" is included in the encoded data 800, "slice_hrd_flag" is "1", and also parameters related to the virtual buffer model operating in units of slices are defined by the "SPS" and the "Buffering period SEI" shown in FIGS. 5 and 6, the control unit 230 controls the decoding times and the displaying times in units of slices.

As explained above, because the decoding times and the displaying times are controlled in units of slices, it is possible to lower reception buffer delays in the decoder and to play back the images with lower delays. Further, in the case where the decoder is not capable of controlling the decoding times and the displaying times in units of slices, even if the encoded data includes valid decode timing information in units of slices, the decoder can ignore the decode timing information in units of slices and control the decoding times and the displaying times in units of pictures, based on the decode timing information in units of pictures.

As explained above, with the encoded data 800 in the first embodiment, it is possible to realize the playback process with lower delays performed by the decoder having the function to control the decoding times and the displaying times in units of slices, while also guaranteeing a playback process performed by a decoder having only the conventional function to control the decoding times and the displaying times in units of pictures.

The decoder core 240 acquires the encoded data 800 from the parser 220. Further, the decoder core 240 acquires the control information 802 from the control unit 230. Using the controlling method indicated by the control information 802 (i.e., in accordance with the virtual buffer model operating either in units of slices or in units of pictures), the decoder core 240 performs the decoding processes on the encoded data 800. The display buffer 250 acquires an image signal 804 resulting from the decoding process, from the decoder core 240 and acquires the control information 803 from the control unit 230. The display buffer 250 outputs the image signal 804 that has been stored in the display buffer 250 at the times indicated by the control information 803 (i.e., at the output times in accordance with the virtual buffer model operating either in units of slices or in units of pictures).

As shown in FIG. 14, in the decoding process performed by the decoder 200, when a picture decoding loop starts (step S201), the decoding processes in units of pictures are sequentially performed until the decoding process has been finished on all the pieces of encoded data or until a stop-decoding instruction is input from an external source (steps S201 through S214).

In the decoding process, when the encoded data is input to the stream buffer 210, the parser reads the encoded data (step S202) and parses the upper-layer header information above the slice (step S203). As a result of the parsing process performed on the upper-layer header, in the case where valid information of the virtual buffer model and the timing information in units of slices are included (step S204: Yes), the decoder core 240 decodes the encoded data in units of slices. The control unit 230 controls the display buffer 250 so that the decoded image signals are displayed in units of slices.

More specifically, when the slice decoding loop starts (step S205), the decoder core 240 waits, for each of the slices, until the decoding time indicated by "Slice timing SEI" comes, in other words, until the decoding time indicated by the timing information in units of slices comes. When the decoding time has come (step S206: Yes), the decoder core 240 performs the decoding process and the displaying process in units of slices (step S207). When the processes described above have been performed on each of all the slices that form the picture, the slice decoding loop ends (step S208). When the processes have been finished for each of all the pictures included in the encoded data, the picture decoding loop thus ends (step S214), and the decoding process is thus completed.

At step S204, as a result of the parsing process performed on the upper-layer header, in the case where no valid information of a buffer model and timing information in units of slices is included (step S204: No), the decoder core 240 decodes the encoded data in units of pictures. Further, the control unit 230 controls the displaying times of the image signals that have been acquired as a result of the decoding processes, in accordance with the virtual buffer model operating in units of pictures. More specifically, the decoder core 240 waits, for each of the pictures, until the decoding time indicated by the "Picture timing SEI" comes, in other words, until the decoding time indicated by the timing information in units of pictures comes. When the decoding time has come (step S209: Yes), the decoder core 240 sequentially performs the decoding processes on the plurality of slices that form the picture that is the processing target (steps S210 through S212). When the decoding process of the targeted picture has been finished (step S212), a process related to displaying of the image signals that have been acquired as a result of the decoding processes is performed (step S213), and the process proceeds to step S214.

As explained above, the decoder 200 according to the first embodiment is able to perform the decoding processes in units of slices. Thus, it is possible to realize a playback process with lower delays. Further, it is also possible to perform decoding processes in units of pictures. Thus, in the case where encoded data that needs to be decoded in units of pictures using the conventional technique has been input, it is possible to perform the decoding processes in units of pictures.

FIG. 15 is a drawing explaining compression/decompression delays occurring in the encoder 100 and the decoder 200 according to the first embodiment. According to the first embodiment, one picture is divided into a plurality of slices, so that the generated code amount is controlled in units of slices, and also, the times at which the data is compressed, transmitted, received, decoded, and displayed are controlled. With this arrangement, it is possible to greatly shorten the buffer delays occurring during the decoding processes. As shown in FIG. 15, it is possible to realize a situation where the total delay occurring between the time when the data is input to the encoder and the time when the image is displayed by the decoder is smaller than one picture, which has been difficult with the conventional methods.

As a first modification example of the first embodiment of the present invention, "Slice timing SEI" may have a data structure as shown in FIG. 16. In the data structure of the "Slice timing SEI" shown in FIG. 16, the "slice_hrd_flag" is the same as the "slice_hrd_flag" included in the "Slice timing SEI" shown in FIG. 8. In other words, the "slice_hrd_flag" is a flag indicating that the virtual buffer model operating in units of slices is valid, in addition to the virtual reception buffer model operating in units of pictures.

In the first modification example of the first embodiment, the number of virtual reception buffer models operating in units of pictures and the number of virtual reception buffer models operating in units of slices does not necessarily have to be one. There may be two or more models each. In the case where there are two or more virtual buffer models operating in units of pictures and two or more virtual buffer models operating in units of slices, the encoding processes are performed so that the encoded data causes no buffer overflow or underflow in any of those virtual buffer models. Further, for each of the virtual buffer models, the buffer size of the virtual reception buffer operating in units of pictures and the buffer size of the virtual reception buffer operating in units of slices are independently set.

The information "cpb_cnt_minus1" included in the "SPS" explained above in the first embodiment with reference to FIG. 5 denotes a value acquired by subtracting "1" from the total number of buffer models (i.e., the sum of the number of virtual buffer models operating in units of pictures and the number of virtual buffer models operating in units of slices). For each of the virtual buffer models the quantity of which is defined by "cpb_cnt_minus1", the buffer size is defined by "cpb_size_value_minus1", whereas the input bit rate to the virtual buffer is defined by "bit_rate_value_minus1".

The total number of virtual buffers operating in units of slices is acquired by adding "1" to the value indicated by the "slice_cpb_cnt_minus1" included in the "Slice timing SEI" shown in FIG. 16. The value indicated by the "slice_cpb_cnt_minus1" must be equal or smaller than the value indicated by the "cpb_size_value_minus1". Information "slice_cpb_removal_delay" shown in FIG. 16 denotes timing information that indicates the decoding time of the slice in the virtual buffer model operating in units of slices. In the case where there are two or more virtual buffers operating in units of slices, the "slice_cpb_removal_delay" is used in common by all the buffer models.

Further, information "slice_sched_sel_idx[idx]" shown in FIG. 16 is an index that indicates correspondence relationships with parameters for the plurality of virtual buffer models that are shown in FIG. 5. In other words, for an idx'th virtual buffer model operating in units of slices shown in FIG. 16, the virtual buffer size thereof is indicated by "cpb_size_value_minus1[Slice_sched_sel_idx[idx]]" shown in FIG. 5, whereas the input bit rate to the virtual buffer is indicated by "bit_rate_value_minus1[Slice_sched_sel_idx[idx]]".

Further, according to the first modification example of the first embodiment, the "slice_cpb_removal_delay" is encoded as a difference from the decoding time of an immediately preceding picture or an immediately preceding slice that includes "Buffering period SEI" shown in FIG. 4, in the virtual buffer model operating in units of slices.

Figures 17, 18:
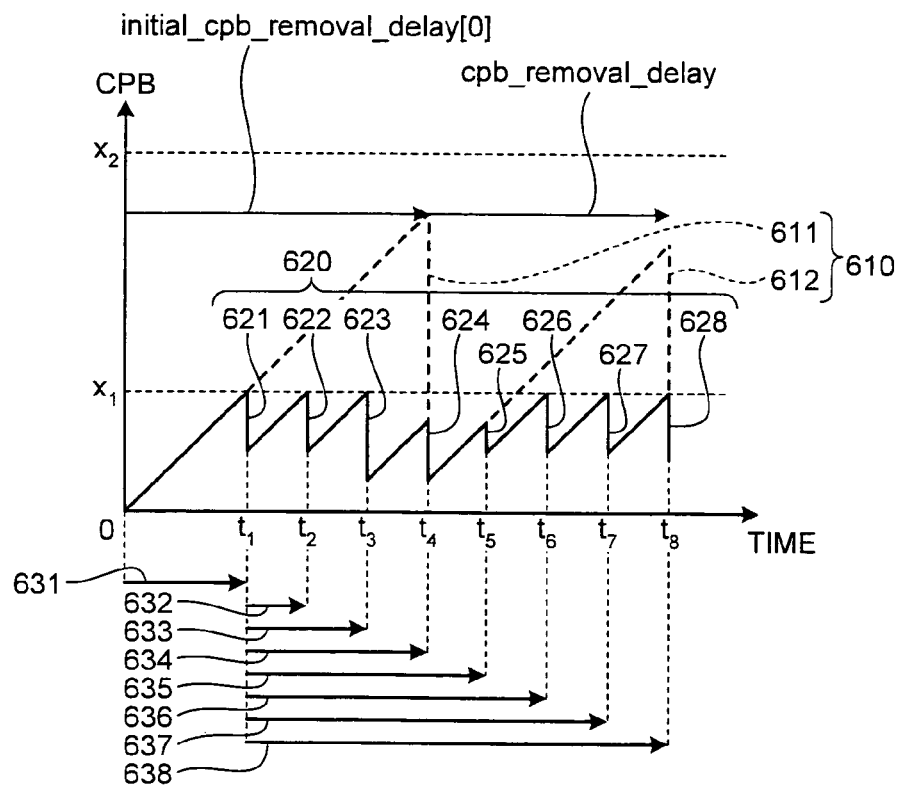
FIG. 17 is a drawing explaining virtual buffer models and decoding times.
FIG. 18 is a drawing explaining a data structure of encoded data according to a second modification example of the first embodiment.

In FIG. 17, an example is shown in which one virtual buffer model operating in units of pictures and one virtual buffer model operating in units of slices are used. The value of the "cpb_cnt_minus1" shown in FIG. 5 is "1", whereas the value of the "slice_cpb_cnt_minus1" shown in FIG. 16 is "0". Also, the value of the "slice_sched_sel_idx[idx]" shown in FIG. 16 is "1". In other words, the index for the virtual buffer model operating in units of slices is "1".

A dotted line 610 shown in FIG. 17 indicates a fluctuation in the buffer occupancy amount in the virtual buffer model operating in units of pictures. A solid line 620 indicates a fluctuation in the buffer occupancy amount in the virtual buffer model operating in units of slices. The value "x2" denotes the buffer size of the virtual buffer model operating in units of pictures and is indicated by "cpb_size_value_minus1[0]" shown in FIG. 5. The value "x1" denotes the buffer size of the virtual buffer model operating in units of slices and is indicated by "cpb_size_value_minus1[1]" shown in FIG. 5. Information "initial_cpb_removal_delay[0]" shown in FIG. 17 indicates an initial delay amount in the virtual buffer model operating in units of pictures and is encoded in the "Buffering period SEI" shown in FIG. 6.

Further, an arrow 631 shown in FIG. 17 indicates an initial delay amount in the virtual buffer model operating in units of slices and is encoded as "initial_cpb_removal_delay[1]" in the "Buffering period SEI" shown in FIG. 6. Information "cpb_removal_delay" shown in FIG. 17 is timing information indicating the decoding time of each picture in the virtual buffer model operating in units of pictures and is encoded in the "Picture timing SEI" shown in FIG. 7. Furthermore, arrows 632 to 638 shown in FIG. 17 indicate pieces of timing information indicating the decoding times of the slices and are respectively encoded for the corresponding slices, as "slice_cpb_removal_delay" shown in FIG. 16 in the "Slice timing SEI".

Next, a process to calculate the timing information in units of slices according to the first modification example of the first embodiment will be explained. By using Formula (3) shown as Expression (9) below, the control unit 150 included in the encoder 100 calculates "slice_cpb_removal_delay(i)" based on the decode starting time of an i'th slice in a picture n, which can be expressed by Expression (7) below. Further, by using Formula (3) shown as Expression (9) below, the control unit 230 included in the decoder 200 calculates the decode starting time of the i'th slice in the picture n, which can be expressed by Expression (8) below, based on the "slice_cpb_removal_delay(i)" that has been received.

$$ts^i_r(n) \qquad\qquad\qquad\qquad\qquad \text{Expression (7)}$$

$$ts^i_r(n) \qquad\qquad\qquad\qquad\qquad \text{Expression (8)}$$

Formula(3)

$$ts^i_r(n) = ts^0_r(n_b) + t_c \times \text{slice\_cpb\_removal\_delay}(i) \qquad (3) \text{ Expression (9)}$$

The term that is separately shown in Expression (10) below denotes the decode starting time of an immediately preceding picture or an immediately preceding slice that includes the "Buffering period SEI" shown in FIG. 4. The term "slice_cpb_removal_delay(i)" is timing information indicating the decoding time of the slice i that is encoded in the "Slice timing SEI". The term "tc" is a constant that indicates the unit time period used in the timing information.

$$ts^0_r(n_b) \qquad\qquad\qquad\qquad\qquad \text{Expression (10)}$$

As explained above, the control unit 150 generates the timing information indicating the decoding time of each of the slices, the timing information being expressed as a difference from the decoding time of the first slice, which is used as a reference.

Alternatively, another arrangement is also acceptable in which the decode starting time of the first slice is calculated based on the "Buffering period SEI", so that the decode starting times of the second slice and the later slices are calculated based on the number of pixels or the number of macro blocks that have already been decoded in the picture. More specifically, the control unit 230 included in the decoder 200 may calculate the decode starting time of the i'th slice in the picture n, which can be expressed by Expression (11) below, by using Formula (4) shown as Expression (12) below.

$$ts_r^i(n) \qquad \text{Expression (11)}$$

Formula (4)

$$ts_r^i(n) = ts_r^0(n) + \Delta t_r \times \frac{\sum_{k=0}^{i-1} MBS(k)}{TMB} \qquad \text{Expression (12)} \qquad (4)$$

The term that is separately shown in Expression (13) below denotes the decode starting time of the first slice in the picture n to which the slice belongs. The term "Δtr" denotes a decoding or display interval of the one picture. The term "TMB" denotes the total number of macro blocks in the one picture. The term that is separately shown in Expression (14) below denotes the total number of macro blocks from a slice 0 to a slice i−1 in the picture. When an image having a fixed frame rate is used, by using Formula (3) shown above, the control unit 150 included in the encoder 100 calculates "slice_cpb_removal_delay(i)" so that the decode starting time of the i'th slice that is calculated by using Formula (4) is equal (or close enough, with a difference smaller than a predetermined value) to the decode starting time of the i'th slice that is calculated by using Formula (3).

$$ts_r^0(n) \qquad \text{Expression (13)}$$

$$\sum_{k=0}^{i-1} MBS(k) \qquad \text{Expression (14)}$$

As explained in the description of the first embodiment, the information is encoded as the "Slice timing SEI" only for the first slice in the picture at the playback starting point. Thus, it is possible to calculate, on the reception side, the decode starting time of each of the slices in the virtual buffer model operating in units of slices. Also, to realize a playback operation starting with an arbitrary picture, it is necessary to encode the "Slice timing SEI" only for at least the first slice in each of the pictures. Further, by attaching "Slice timing SEI" for each of all the slices, it is possible to easily acquire, on the reception side, the decode starting times of the slices out of the encoded data, without having to perform the calculation shown in Formula (4). Furthermore, in the case where the "Slice timing SEI" for each of all the slices is attached, even if data is lost in units of slices on the receptions side due to a transmission error or a packet loss, it is possible to start a decoding process at an appropriate time, beginning with an arbitrary slice. Thus, error resistance level is also improved.

As a second modification example of the first embodiment of the present invention, the encoded data may have a data structure as shown in FIG. 18. In the data structure shown in FIG. 18, "Slice HRD Parameters" are additionally provided, within the "Sequence Parameter Set (SPS)" or following the "SPS". Also, "Slice Buffering Period SEI" is additionally provided, following the "Buffering period SEI".

As shown in FIG. 19, the "Slice HRD Parameters" include information related to the number of virtual buffer models operating in units of slices, the bit rate, and the buffer size of the virtual reception buffer. Information "slice_cpb_cnt_minus1" shown in FIG. 19 denotes a value acquired by subtracting "1" from the number of virtual buffer models operating in units of slices. Information "bit_rate_scale" and information "slice_cpb_size_scale" denote a bit rate unit and a virtual reception buffer size unit, respectively. Information "bit_rate_value_minus1" and information "slice_cpb_size_value_minus1" denote the input bit rate and the virtual buffer size for a "SchedSelIdx"'th virtual buffer model operating in units of slices, respectively.

As shown in FIG. 20, the "Slice Buffering Period SEI" includes information related to an initial delay amount in the virtual buffer model operating in units of slices. When the "Slice Buffering Period SEI" is inserted at the head and in arbitrary positions of the encoded data, it is possible to play back the encoded data from any position in the middle of the encoded data. Information "seq_parameter_set_id" shown in FIG. 20 is an index used for specifying the "Slice HRD Parameters" that define the virtual buffer model operating in units of slices. Information "slice_initial_cpb_removal_delay" is information indicating the initial delay amount of the virtual buffer model operating in units of slices. The sum of the "slice_initial_cpb_removal_delay" and "slice_initial_cpb_removal_delay_offset" is arranged so as to be constant. The sum is the maximum delay amount in the virtual buffer model operating in units of slices.

Figures 21, 22:
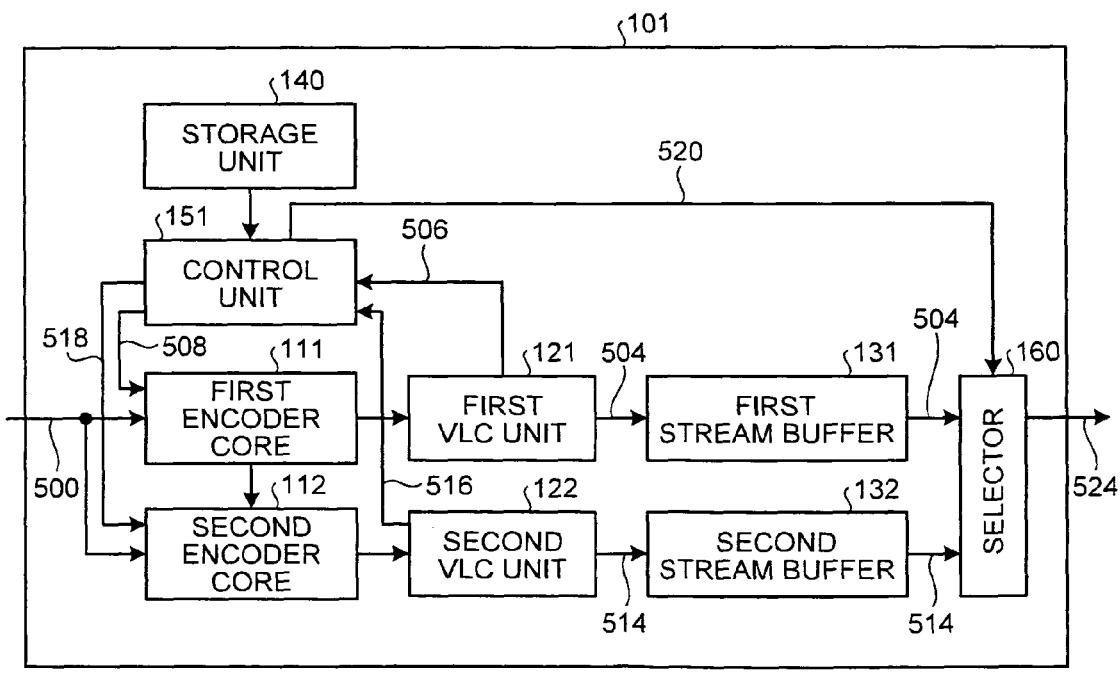
FIG. 21 is a drawing explaining a data structure of "Slice timing SEI" according to a third modification example of the first embodiment.
FIG. 22 is a block diagram of an encoder according to a second embodiment of the present invention.

As a third modification example of the first embodiment of the present invention, the "Slice timing SEI" may have a data structure as shown in FIG. 21. As shown in FIG. 21, the "Slice timing SEI" according to the third modification example includes the "slice_hrd_flag", the "slice_cpb_removal_delay", and a "slice_dpb_output_delay". The "slice_hrd_flag" indicates whether the virtual buffer model operating in units of slices is valid or invalid. The "slice_cpb_removal_delay" is information about the decoding time of each of the slices that is expressed as a delay time period from the decoding time of the picture including the "Slice Buffering Period SEI". The "slice_dpb_output_delay" is information about the displaying time of the slice that is expressed as a delay time period from the decoding time of the slice. In a decoder that is compliant with the virtual buffer model operating in units of slices, the decoding times and the displaying times are controlled based on these pieces of timing information.

An encoder according to a second embodiment of the present invention includes a plurality of sets each made up of an encoder core, a VLC unit, and a stream buffer. These sets encode mutually the same input image signal 500 by using mutually different encoding parameters. Optimal encoded data is selected and output, based on generated code amounts. In the second embodiment, an encoder including two sets each made up of the constituent elements such as the encoder core is explained. However, the encoder may include three or more sets each made up of the constituent elements.

As shown in FIG. 22, an encoder 101 according to the second embodiment includes a first encoder core 111, a first VLC unit 121, a first stream buffer 131, a second encoder core 112, a second VLC unit 122, a second stream buffer 132, a storage unit 140, a control unit 151, and a selector 160.

The first encoder core 111 and the second encoder core 112 perform regular encoding processes under the control of the control unit 151. The control unit 151 sets mutually different encoding parameters 508 and 518 (e.g., mutually different quantization parameters) into the first encoder core 111 and the second encoder core 112, respectively. The first encoder core 111 and the first VLC unit 121 generate first encoded data 504 by using a first parameter and temporarily store the first encoded data 504 into the first stream buffer 131. Similarly, the second encoder core 112 and the second VLC unit 122 generate second encoded data 514 by using a second parameter and temporarily store the second encoded data 514 into the second stream buffer 132.

The control unit 151 acquires generated code amount information 506 and generated code amount information 516 each indicating a generated code amount, from the first VLC unit 121 and from the second VLC unit 122, respectively. Based on the generated code amount information 506 and the generated code amount information 516, the control unit 151 selects optimal encoded data between the first encoded data and the second encoded data within a code amount allowance and outputs selection information 520 indicating the selected encoded data to the selector 160, so that selected encoded data 524 is output via the selector 160.

The optimal encoded data may be such encoded data of which the code amount does not exceed the upper limit and that has the smallest error between the input image and the decoded image. As another example, the optimal encoded data may simply be such encoded data that has the smallest average quantization width.

The control unit 151 calculates buffer occupancy fluctuation amounts of the virtual buffer model operating in units of slices and the virtual buffer model operating in units of pictures and controls the code amounts of the first encoder core 111 and the second encoder core 112 in such a manner that no overflow or underflow occurs in the virtual buffers. Generally, as the number of slices into which one picture is divided becomes larger, it becomes more difficult to exercise feedback control and keep the generated code amount equal to or smaller than a predetermined level in units of slices. Thus, to guarantee a satisfactory code amount without fail, it is necessary to perform an encoding process with a large margin, in other words, with a code amount that is smaller than a code amount allowance.

By causing the plurality of encoders to simultaneously perform the encoding processes while using the mutually different parameters, it becomes easier to realize encoding processes with high image quality while utilizing the code amount allowance to the maximum extent. In addition, because the encoding processes are performed in parallel, the delays in the encoding process do not increase. Thus, it is possible to realize a low-delay encoding process.

Figure 23:
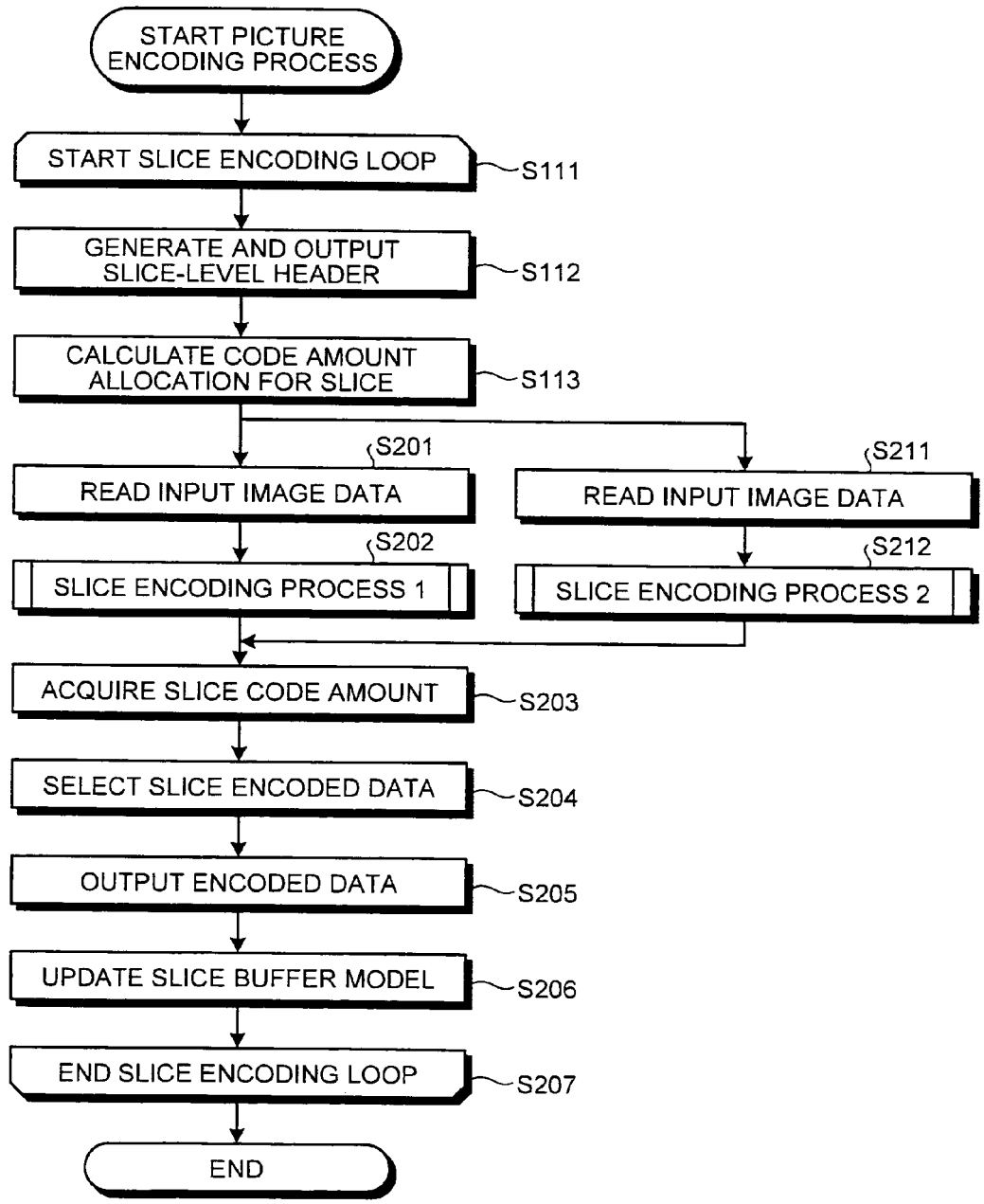
FIG. 23 is a flowchart of a picture encoding process performed by the encoder according to the second embodiment.

In the encoding process performed by the encoder 101 according to the second embodiment, the set including the first encoder core 111 and the set including the second encoder core 112 each perform the encoding process during the picture encoding process explained in the first embodiment. As shown in FIG. 23, during the picture encoding process performed by the encoder 101 according to the second embodiment, after the control unit 151 calculates an allocated code amount (step S113), the first encoder core 111 and the second encoder core 112 each read an input image signal for mutually the same slice (steps S201 and S211) and perform a slice encoding process 1 (step S202) and a slice encoding process 2 (step S212), respectively, while using the mutually different encoding parameters.

Each of the processes performed in the slice encoding process 1 (step S202) and the slice encoding process 2 (step S212) is the same as the slice encoding process explained with reference to FIG. 12 in the first embodiment.

The encoding parameters are parameters related to, for example, quantization widths, prediction methods (e.g., an intra-frame encoding method, an inter-frame encoding method), picture structures (frames or fields), code amount controlling methods (e.g., fixed quantization, feedback control).

After that, the control unit 151 acquires the generated code amount information 506 and the generated code amount information 516 for the slice encoding process 1 and the slice encoding process 2 from the first VLC unit 121 and the second VLC unit 122, respectively (step S203) and selects, for each of the slices, an encoding result that is equal to or smaller than the allocated code amount for the slice and is closest to the allocated code amount (step S204). Subsequently, the control unit 151 outputs the selected encoded data via the selector 160 (step S205). After that, the control unit 151 updates the buffer occupancy amount of the virtual buffer model operating in units of slices based on the generated code amount of the slice encoded data that has been selected (step S206). When the encoding process has been completed for each of all the slices that form one picture, the encoding process for the picture has been finished (step S207).

As explained above, because the encoding processes are performed on the same slice by using the mutually different encoding parameters, so that the encoded data having a generated code amount that is closest to the allocated code amount is selected, it is possible to output a more efficient encoding result. In the description of the second embodiment, the encoding processes are performed on the same slice while using the two types of parameters. However, another arrangement is acceptable in which three or more encoding parameters are selected and used.

Other configurations and processes of the encoder 101 according to the second embodiment are the same as the configurations and the processes of the encoder 100 according to the first embodiment.

Each of the encoders and the decoders according to the exemplary embodiments described above includes a control device such as a Central Processing Unit (CPU), storage devices such as a Read-Only memory (ROM) and/or a Random Access Memory (RAM), external storage devices such as a Hard Disk Drive and/or a Compact Disk (CD) Drive Device, a display device such as a display monitor, and input devices such as a keyboard and/or a mouse. Each of the encoders and the decoders has a hardware configuration to which a commonly-used computer may be applied.

A moving image encoding computer program and a moving image decoding computer program that are executed by any of the encoders and the decoders according to the exemplary embodiments are provided as being recorded on a computer-readable recording medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format.

Another arrangement is acceptable in which the moving image encoding computer program and the moving image decoding computer program that are executed by any of the encoders and the decoders according to the exemplary embodiments are stored in a computer connected to a network like the Internet, so that the computer programs are provided as being downloaded via the network. Yet another arrangement is acceptable in which the moving image encoding computer program and the moving image decoding computer program that are executed by any of the encoders and the decoders according to the exemplary embodiments are provided or distributed via a network like the Internet.

Further, yet another arrangement is acceptable in which the moving image encoding computer program and the moving image decoding computer program in any of the exemplary embodiments are provided as being incorporated in a ROM or the like in advance.

The moving image encoding computer program and the moving image decoding computer program that are executed by any of the encoders and the decoders according to the exemplary embodiments each have a module configuration that includes the functional units described above. As the actual hardware configuration, these functional units are loaded into a main storage device when the CPU (i.e., the processor) reads and executes these functional units from the storage medium described above, so that these functional units are generated in the main storage device.

The present invention is not limited to the exemplary embodiments described above. At the implementation stage of the invention, it is possible to materialize the present invention while applying modifications to the constituent elements, without departing from the gist thereof. In addition, it is possible to form various inventions by combining, as necessary, two or more of the constituent elements disclosed in the exemplary embodiments. For example, it is acceptable to omit some of the constituent elements described in the exemplary embodiments. Further, it is acceptable to combine, as necessary, the constituent elements from mutually different ones of the exemplary embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image encoding method comprising:
dividing a picture of a moving image into a plurality of slices;
generating an image code sequence that is obtained by coding a slice;
outputting encoded data for which first timing information is added to the image code sequence, the first timing information indicating a time at which the slice is to be decoded and no underflow or overflow occurs in a first virtual reception buffer from which the image code sequence is output in a slice unit.

2. An image encoding apparatus comprising:
a divider that divides a picture of a moving image into a plurality of slices;
a generator that generates an image code sequence that is obtained by coding a slice;
an output that outputs encoded data for which first timing information is added to the image code sequence, the first timing information indicating a first time at which the slice is to be decoded and no underflow or overflow occurs in a first virtual reception buffer from which the image code sequence is output in a slice unit.

3. The apparatus according to claim 2, further comprising:
a controller that controls a data amount of the image code sequence corresponding to the slice on the basis of first buffer size information of the first virtual reception buffer from which the image code sequence corresponding to the slice is output in a slice unit.

4. The apparatus according to claim 2, wherein the output outputs encoded data for which second timing information is further added to the image code sequence, the second timing information indicating a second time at which the picture is to be decoded and no underflow or overflow occurs in a second virtual reception buffer from which the image code sequence is output in a picture unit.

5. The apparatus according to claim 4, further comprising:
a controller that controls a data amount of the image code sequence corresponding to the slice on the basis of second buffer size information of the second virtual reception buffer.

6. An image encoding apparatus comprising:
a memory; and
a control device accessing the memory to execute a program so as to perform operations comprising:
dividing a picture of a moving image into a plurality of slices;
generating an image code sequence that is obtained by coding a slice; and
outputting encoded data for which first timing information is added to the image code sequence, the first timing information indicating a first time at which the slice is to be decoded and no underflow or overflow occurs in a first virtual reception buffer from which the image code sequence is output in a slice unit.

7. The apparatus according to claim 6, wherein the control device performs further operations comprising:
controlling a data amount of the image code sequence corresponding to the slice on the basis of first buffer size information of the first virtual reception buffer from which the image code sequence corresponding to the slice is output in a slice unit.

8. The apparatus according to claim 6, wherein the control device performs further operations comprising:
outputting encoded data for which second timing information is further added to the image code sequence, the second timing information indicating a second time at which the picture is to be decoded and no underflow or overflow occurs in a second virtual reception buffer from which the image code sequence is output in a picture unit.

9. The apparatus according to claim 8, wherein the control device performs further operations comprising:
controlling a data amount of the image code sequence corresponding to the slice on the basis of second buffer size information of the second virtual reception buffer.

* * * * *